United States Patent
Taylor et al.

(10) Patent No.: US 11,188,516 B2
(45) Date of Patent: Nov. 30, 2021

(54) PROVIDING CONSISTENT DATABASE RECOVERY AFTER DATABASE FAILURE FOR DISTRIBUTED DATABASES WITH NON-DURABLE STORAGE LEVERAGING BACKGROUND SYNCHRONIZATION POINT

(71) Applicant: Oracle International Corporation, Redwood Shores, CA (US)

(72) Inventors: Derek Taylor, San Jose, CA (US); Chi-Kim Hoang, Palo Alto, CA (US); Yu-Han Chou, San Mateo, CA (US); Varadarajan Aravamudhan, Milpitas, CA (US)

(73) Assignee: Oracle International Corproation, Redwood Shores, CA (US)

( * ) Notice: Subject to any disclaimer, the term of this patent is extended or adjusted under 35 U.S.C. 154(b) by 0 days.

(21) Appl. No.: 16/522,419

(22) Filed: Jul. 25, 2019

(65) Prior Publication Data

US 2020/0065297 A1 Feb. 27, 2020

Related U.S. Application Data

(60) Provisional application No. 62/722,818, filed on Aug. 24, 2018, provisional application No. 62/748,273, (Continued)

(51) Int. Cl.
*G06F 16/23* (2019.01)
*G06F 16/27* (2019.01)

(52) U.S. Cl.
CPC ...... *G06F 16/2365* (2019.01); *G06F 16/2358* (2019.01); *G06F 16/2379* (2019.01); *G06F 16/273* (2019.01)

(58) Field of Classification Search
CPC .............. G06F 16/2365; G06F 16/273; G06F 16/2379; G06F 16/2358
(Continued)

(56) References Cited

U.S. PATENT DOCUMENTS 5,280,611 A 1/1994 Mohan
5,574,902 A 11/1996 Josten
(Continued)

FOREIGN PATENT DOCUMENTS

KR 10-2010-0131054 12/2010

OTHER PUBLICATIONS

Choudhary, U.S. Appl. No. 15/262,380, filed Sep. 12, 2016, Notice of Allowance, dated Feb. 1, 2019.
(Continued)

*Primary Examiner* — James Trujillo
*Assistant Examiner* — Fariborz Khoshnoodi
(74) *Attorney, Agent, or Firm* — Hickman Becker Bingham Ledesma LLP (57) ABSTRACT

An approach for consistent database recovery for distributed database systems uses "synchronization points". A synchronization point is a global timestamp for which across all nodes of a distributed database system, the nodes have stored change records for any transaction occurring at and before the synchronization point in persistent logs. Each node may employ asynchronous flushing. However, on a periodic basis, each node coordinates to establish a synchronization point, which may entail ensuring change records for transactions that committed at or before the synchronization point are stored in persistent logs. In effect, a synchronization point represents that any transaction committed at or before the synchronization point has been durably committed.

20 Claims, 6 Drawing Sheets

Related U.S. Application Data filed on Oct. 19, 2018, provisional application No. 62/846,334, filed on May 10, 2019.

(58) Field of Classification Search
USPC .......................................................... 707/685
See application file for complete search history.

(56) References Cited

U.S. PATENT DOCUMENTS

| | | | |
|---|---|---|---|
| 5,897,634 | A | 4/1999 | Attaluri et al. |
| 6,078,994 | A | 6/2000 | Carey |
| 6,125,368 | A * | 9/2000 | Bridge ................ G06F 11/1415 |
| 6,351,754 | B1 | 2/2002 | Bridge et al. |
| 6,411,968 | B2 | 6/2002 | Bamford et al. |
| 6,434,672 | B1 | 8/2002 | Gaither |
| 6,557,082 | B1 | 4/2003 | Josten et al. |
| 7,200,623 | B2 | 4/2007 | Chandrasekaran |
| 7,496,783 | B1 | 2/2009 | Graf |
| 7,581,064 | B1 | 8/2009 | Zedlewski |
| 7,822,717 | B2 | 10/2010 | Kappor et al. |
| 7,822,727 | B1 | 10/2010 | Shaughnessy |
| 7,840,752 | B2 | 11/2010 | Hu et al. |
| 8,364,648 | B1 | 1/2013 | Sim-Tang |
| 8,429,134 | B2 | 4/2013 | Chan |
| 8,484,163 | B1 | 7/2013 | Yucel |
| 8,489,820 | B1 | 7/2013 | Ellard |
| 9,021,296 | B1 | 4/2015 | Kiselev |
| 9,189,502 | B2 | 11/2015 | Panteleenko |
| 9,223,843 | B1 | 12/2015 | Madhavarapu |
| 9,298,564 | B2 | 3/2016 | Lee et al. |
| 9,703,706 | B2 | 7/2017 | Bagal et al. |
| 9,817,587 | B1 | 11/2017 | Leshinsky |
| 10,664,361 | B1 | 5/2020 | Carr |
| 2002/0026448 | A1 | 2/2002 | Bird et al. |
| 2002/0052914 | A1 | 5/2002 | Zalewski et al. |
| 2002/0112022 | A1 | 8/2002 | Kazar et al. |
| 2003/0005265 | A1 | 1/2003 | Barowski |
| 2003/0061537 | A1 | 3/2003 | Cha et al. |
| 2004/0019821 | A1 | 1/2004 | Chu |
| 2004/0215883 | A1 | 10/2004 | Bamford et al. |
| 2004/0230691 | A1 | 11/2004 | Wookey |
| 2004/0267809 | A1 | 12/2004 | East et al. |
| 2005/0193160 | A1 | 9/2005 | Bhatt et al. |
| 2005/0204112 | A1 | 9/2005 | O'Connor et al. |
| 2005/0223174 | A1 | 10/2005 | Mogi |
| 2006/0010180 | A1 | 1/2006 | Kawamura |
| 2006/0143256 | A1 | 6/2006 | Galchev |
| 2006/0248131 | A1 | 11/2006 | Marwinski et al. |
| 2007/0100912 | A1 | 5/2007 | Pareek et al. |
| 2007/0192384 | A1 | 8/2007 | Shodhan et al. |
| 2007/0244918 | A1 | 10/2007 | Lee et al. |
| 2008/0235294 | A1 | 9/2008 | Girkar |
| 2009/0164733 | A1 | 6/2009 | Kim et al. |
| 2009/0240664 | A1 * | 9/2009 | Dinker ..................... G06F 16/27 |
| 2009/0276654 | A1 | 11/2009 | Butterworth et al. |
| 2010/0122026 | A1 | 5/2010 | Umamageswaran et al. |
| 2010/0185817 | A1 | 7/2010 | Magenheimer |
| 2011/0004586 | A1 | 1/2011 | Cherryholmes et al. |
| 2011/0060724 | A1 | 3/2011 | Chan |
| 2011/0087633 | A1 | 4/2011 | Kreuder et al. |
| 2011/0113036 | A1 | 5/2011 | Idicula et al. |
| 2011/0307450 | A1 | 12/2011 | Hahn et al. |
| 2012/0005158 | A1 | 1/2012 | Bhatt et al. |
| 2012/0054533 | A1 * | 3/2012 | Shi ..................... G06F 11/2097 |
| | | | 714/4.1 |
| 2012/0166490 | A1 | 6/2012 | Raatikka |
| 2012/0221768 | A1 | 8/2012 | Bagal et al. |
| 2013/0042156 | A1 | 2/2013 | Srinivasan |
| 2013/0117237 | A1 | 5/2013 | Thomsen et al. |
| 2013/0212068 | A1 | 8/2013 | Talius et al. |
| 2014/0095452 | A1 | 4/2014 | Lee et al. |
| 2014/0172803 | A1 | 6/2014 | Diaconu |
| 2014/0258223 | A1 | 9/2014 | Cao |
| 2015/0120659 | A1 * | 4/2015 | Srivastava .......... G06F 11/2038 |
| | | | 707/625 |
| 2015/0121126 | A1 | 4/2015 | Bradshaw |
| 2015/0134616 | A1 | 5/2015 | Zheng |
| 2015/0317212 | A1 | 11/2015 | Lee |
| 2016/0292037 | A1 | 10/2016 | Kandukuri et al. |
| 2016/0292049 | A1 | 10/2016 | Kandukuri et al. |
| 2016/0344834 | A1 | 11/2016 | Das |
| 2016/0371319 | A1 * | 12/2016 | Park ....................... G06F 16/951 |
| 2017/0116321 | A1 * | 4/2017 | Jain ........................... G06F 16/21 |
| 2017/0116334 | A1 * | 4/2017 | Kruglikov ............. G06F 16/951 |
| 2017/0177697 | A1 * | 6/2017 | Lee ........................... H04L 67/10 |
| 2017/0220621 | A1 * | 8/2017 | Colrain ............... G06F 16/2379 |
| 2018/0011893 | A1 | 1/2018 | Kimura |

OTHER PUBLICATIONS

U.S. Appl. No. 13/037,172, filed Feb. 28, 2011, Advisory Action, dated Jul. 12, 2016.

Lee, U.S. Appl. No. 14/270,117, filed May 5, 2014, Notice of Allowance, dated Aug. 6, 2018.

Lee, U.S. Appl. No. 14/270,117, filed May 5, 2014, Interview Summary, dated Oct. 3, 2017.

Lee, U.S. Appl. No. 14/270,117, filed May 5, 2014, Decision on Appeal dated Jul. 25, 2018.

Kandukuri, U.S. Appl. No. 14/675,497, filed Mar. 31, 2015, Notice of Allowance, dated Mar. 29, 2017.

Bagal, U.S. Appl. No. 13/037,172, filed Feb. 28, 2011, Final Office Action, dated Sep. 16, 2013.

Choudhary, U.S. Appl. No. 15/262,380, filed Sep. 12, 2016, Notice of Allowance, dated Sep. 21, 2018.

U.S. Appl. No. 13/037,172, filed Feb. 28, 2011, Final Office Action, dated Sep. 16, 2013.

Bagal, U.S. Appl. No. 13/037,172, filed Feb. 28, 2011, Office Action, dated Nov. 9, 2016.

Bagal, U.S. Appl. No. 13/037,172, filed Feb. 28, 2011, Notice of Allowance, dated Mar. 1, 2017.

Bagal, U.S. Appl. No. 13/037,172, filed Feb. 28, 2011, Office Action, dated May 23, 2013.

Bagal, U.S. Appl. No. 13/037,172, filed Feb. 28, 2011, Office Action, dated Jan. 7, 2013.

Kandukuri, U.S. Appl. No. 14/675,497, filed Mar. 31, 2015, Notice of Allowability, dated Apr. 19, 2017.

U.S. Appl. No. 13/037,172, filed Feb. 28, 2011, Office Action, dated Nov. 5, 2015.

U.S. Appl. No. 14/675,490, filed Mar. 31, 2015, Notice of Allowance, dated Sep. 23, 2016.

U.S. Appl. No. 14/270,117, filed May 5, 2014, Final Office Action, dated Oct. 7, 2016.

U.S. Appl. No. 14/270,117, filed May 5, 2014, Interview Summary, dated Sep. 14, 2016.

U.S. Appl. No. 14/270,117, filed May 5, 2014, Office Action, dated Jun. 16, 2016.

U.S. Appl. No. 13/830,349, filed Mar. 14, 2013, Office Action, dated Nov. 5, 2014.

U.S. Appl. No. 13/830,349, filed Mar. 14, 2013, Notice of Allowance, dated Oct. 19, 2015.

U.S. Appl. No. 13/037,172, filed Feb. 28, 2011, Final Office Action, dated Mar. 29, 2016.

U.S. Appl. No. 13/830,349, filed Mar. 14, 2013, Final Office Action, dated Jun. 2, 2015.

U.S. Appl. No. 13/037,172, filed Feb. 28, 2011, Final Office Action, dated Apr. 16, 2015.

U.S. Appl. No. 13/037,172, filed Feb. 28, 2011, Office Action, dated Nov. 6, 2014.

U.S. Appl. No. 13/037,172, filed Feb. 28, 2011, Office Action, dated May 23, 2013.

U.S. Appl. No. 13/037,172, filed Feb. 28, 2011, Office Action, dated Jan. 7, 2013.

U.S. Appl. No. 13/037,172, filed Feb. 28, 2011, Interview Summary, dated Nov. 9, 2016.

U.S. Appl. No. 13/037,172, filed Feb. 28, 2011, Interview Summary, dated Jul. 5, 2016.

U.S. Appl. No. 14/675,497, filed Mar. 31, 2015, Office Action, dated Sep. 29, 2016.

(56) References Cited

OTHER PUBLICATIONS

U.S. Appl. No. 13/830,349, filed Mar. 14, 2013, Interview Summary, dated Mar. 9, 2015.
Lahiri, U.S. Appl. No. 16/232,860, filed Dec. 26, 2018, Office Action, dated Jul. 2, 2020.
Liu, Xin et al. "CLIC: Client-Informed Caching for Storage Servers." Feb. 2009. USENIX. FAST '09. pp. 297-310.
"In the Lab: Full ESX/vMotion Test Lab in a Box, Part 2", dated Aug. 2009, https://blog.solori.net/2009/08/17/in-the-lab-full-escmotion-test-lab-in-a-box-part-2/.
Chandrasekaran, Sashikanth and Bamford, Roger, "Shared Cache—The Future of Parallel Databases." Mar. 2003. ICDE'03. pp. 840-850.
Dongho Lee et al., "Checkpointing Schemes for Fast Restart in Main Memory Database Systems", IEEE 1997, pp. 663-668.
Hennessy, John L., and Patterson, David A., Computer Architecture: A Quantitative Approach. 2007; Elsevier. 4th ed. pp. 287-315.
Jung, Hoyoung et al. "LRU-WSR: Integration of LRU and Write Sequence Reordering for Flash Memory." Aug. 2008. IEEE. IEEE Transactions on Consumer Electronics. vol. 54. pp. 1215-1223.
Jun-Lin Lin et al., "A Low-Cost Checkpointing Technique for Distributed Databases", Distributed and Parallel Databases, vol. 10, No. 3, dated Dec. 31, 2001, pp. 241-268.
"In the Lab: Full ESX/vMotion Test Lab in a Box, Part 1", dated Aug. 2009, https://blog.solori.net/2009/08/17/in-the-lab-full-escmotion-test-lab-in-a-box-part-1/.
Koltsidas, Ioannis and Viglas, Stratis D., "The Case for Flash-Aware Multi-Level Caching." 2009. University of Edinburgh. Tech Report EDI-INF-RR-1319.
Yadgar et al., "Karma: Know it All Replacement for a Multilevel Cache", dated Jan. 1, 2007, 16 pages.

Peetz, Andreas, "A Myth Busted and an FAQ: ESXi is *not* Based on Linux! But what is it?", dated Aug. 2013, http://www.vfront.de/2013/08a-myth-busted-and-faqe-sxi-is-not based.html.
Rik Van Riel "Page replacement in Linux 2.4 memory management." Jun. 2001. USENIX; FREENIX 2001.
Sang Hyuk Son et al., "Distributed Checkpointing for Globally Consistent States of Databases", IEEE Transactions on Software Engineering, vol. 15 No. 10, dated Oct. 1, 1989, pp. 1157-1167.
Soundararajan, Gokul et al., "Dynamic Partitioning of the Cache Hierarchy in Shared Data Centers." Aug. 2008. ACM. '08. pp. 635-646.
Venkatarman, Shivakumar, Global Memory Management for Multi-Server Database Systems. 1996. University of Wisconsin—Madison. pp. 24-32.
Wong, Theodore M., and Wilkes, John, "My cache or yours? Making storage more exclusive." Jun. 2002. USENIX. FAST '02.
Jun-Lin Lin et al., "A Survey of Distributed Database Checkpointing", Distributed and Parallel Databases, vol. 5, No. 3, dated Jul. 3, 1997, pp. 289-319.
Pelley et al., "Storage Management in the NVRAM Era", Proceedings of the VLDB Endowment, ACM vol. 7, No. 2, dated Oct. 1, 2013, pp. 121-132.
Huang Jian et al., "NVRAM-Aware Logging in Transaction Systems", Proceedings of the VLDB Endowment, vol. 8, No. 4, dated Dec. 1, 2014, pp. 389-400.
Pavlo, Andy, "15-721 Database Systems", Lecture #23 Non-Volatile Memory, dated Spring 2016, 70 pages.
Narayanan et al., "Whole-system Persistence", Mar. 2012, ACM, Seventeenth International Conference on Architectural Support for Programming Languages and Operating Systems (ASPLOS 2012), 2012.
Craig Mullins, in-memory database management system (IMDBMS), Feb. 2015, <https:// searchdatamanagement.techtarget.com/definition/in-memory-database-management-system-IMDBMS>, 2015.

* cited by examiner

PROVIDING CONSISTENT DATABASE RECOVERY AFTER DATABASE FAILURE FOR DISTRIBUTED DATABASES WITH NON-DURABLE STORAGE LEVERAGING BACKGROUND SYNCHRONIZATION POINT

CROSS-REFERENCE TO RELATED APPLICATIONS

This application is related to U.S. application Ser. No. 16/232,860, filed Dec. 26, 2018, entitled "Using Non-Volatile Memory to Improve the Availability of an In-Memory Database"; U.S. application Ser. No. 14/726,133, filed May 29, 2015, entitled "Elimination of Log File Synchronization Delay at Transaction Commit Time"; and International Application No. PCT/US2014/043259, filed Jun. 19, 2014, entitled "System and Method for Cloud Connection Pool"; the entire contents for each of which is hereby incorporated by reference as if fully set forth herein.

TECHNICAL FIELD

Embodiments described herein relate generally to databases, and more specifically, to techniques for increasing the efficiency of recovery operations for distributed database systems with asynchronous flush.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

An in-memory database management system (IMDBMS) is a database management system (DBMS) that primarily relies on random access memory (RAM) for computer data storage. This is contrasted with block-based DBMSs that employ block-based persistent storage (block-based storage) as primary storage. In a block-based DBMS, database data is organized into data blocks. Database data in a block-based DBMS is manipulated by first reading the data blocks from block-based storage into in-memory buffers of the DBMS, modifying the data blocks in the buffers, and then rewriting the modified data blocks to block-based persistent storage.

IMDBMSs are faster than block-based DBMSs because access to block-based storage is slower than main memory access. For an IMDBMS, non-durable commits are often used for achieving even higher performance. For non-durable commits, applications do not have to wait for a transaction to be synchronously recorded to a persistent storage before the applications can perform another database operation. Non-durable commits can greatly improve latency and throughput for workloads. However, a technical hurdle with non-durably commits is the volatility of main memory, which comprises volatile random-access memory (RAM). In a system failure, database data stored in main memory that was modified by non-durably committed transactions and that has not been durably recorded may be lost.

One way to ensure transactions are durably recorded is to use durable commits. Durable commits can be achieved by flushing transaction change records stored in in-memory log buffers to persistent logs in persistent storage before acknowledging commitment. Flushing transaction change records in this way is referred to as synchronous flushing. No transaction is acknowledged as committed until all the modifications generated by the transaction or depended on by the transaction are recorded on persistent storage. Durable commits ensure the recording of committed transactions even if the server crashes or loses power.

In comparison, non-durable commits acknowledge commitment without requiring flushing transaction change records to the persistent storage. The transaction change records may be flushed after acknowledging commit of the transaction for which the change records were generated. Flushing change records in this way is referred to herein as asynchronous flushing. For non-durable commits, data may be unrecoverable in the case of database system failure.

For single-node database systems, persistent storage may be used to enable recovery from system failures. This is done through flushing change records of a transaction from RAM to persistent storage. A checkpoint image of the database is periodically generated and is stored in persistent storage. A transaction log is used to store change records, each of which may store a description of a change that a transaction makes to the database and/or a description of action taking regarding the transaction (e.g., a commit). Recovery entails loading the entire latest checkpoint image from persistent storage and applying the change records (i.e., redo and undo change records) in change log to synchronize the database to a state that existed just prior to the system failure.

For the multiple nodes in a distributed database system, flushing may happen on all nodes either synchronously or asynchronously. In case of a database failure, the checkpoint images in the persistent storage on each node are used to reconstruct the database by applying flushed change records to the checkpoint images.

Under synchronous flushing, database recovery in case of failure is relatively straightforward: Recover each node from its checkpoint image and resolve all open transactions at the time of failure. However, synchronous flushing requires flushing transaction change records stored in in-memory log buffers to persistent logs in persistent storage before acknowledging commitment, which causes synchronous flushing to have lower performance than asynchronous flushing. Thus, requiring all transactions to perform synchronous flushing is very costly and undermines the benefits of using fast, non-durable storage.

Distributed databases with asynchronous flushing can achieve much better performance in terms of latency and throughput. However, with asynchronous flushing, change records stored in the persistent logs (i.e., logs stored in persistent storage) for committed transactions can be inconsistent between each node before recovery.

One example of possible inconsistency after database recovery involves partially durably committed transactions. For example, a distributed transaction T involves updating data on two nodes, node 1 and node 2. After a database failure, the latest persistent logs on one node 1 contains changes committed for T, but persistent logs for node 2 do not contain changes committed for T.

Another example of possible inconsistency after database recovery involves dependency violation. For example, transaction T2 has a dependency on transaction T1. The dependency could be parent-child, unique constraint check, or any logical data dependency, etc. T1 updates data only on node 1 while T2 updates data only on node 2. After database failure, the persistent log on node 1 does not contain changes committed from T1. However, the persistent log on node 2 contains changes committed from T2.

One approach to resolve inconsistency involves navigating through all nodes to resolve the inconsistency between nodes. However, this approach is very time consuming.

Thus, there is a need for providing consistent database recovery after database failure for a distributed database system using asynchronous flushing.

Described herein are techniques that ensure consistency of recovery in a distributed database system using asynchronous flushing.

DETAILED DESCRIPTION

In the following description, for the purposes of explanation, numerous specific details are set forth in order to provide a thorough understanding of the embodiments. It will be apparent, however, that the embodiments may be practiced without these specific details. In other instances, well-known structures and devices are shown in block diagram form in order to avoid unnecessarily obscuring embodiments.

General Overview

Described herein are approaches for consistent database recovery for distributed database systems using "synchronization points". A synchronization point is a global timestamp for which across all nodes of a distributed database system, the nodes have persisted change records for any transaction occurring at and before the synchronization point in persistent logs. Each node may employ asynchronous flushing. However, on a periodic basis, each node coordinates to establish a synchronization point, which may entail ensuring change records for transactions that committed at or before the synchronization point are stored in persistent logs. In effect, a synchronization point represents that any transaction committed at or before the synchronization point has been durably committed.

During recovery, all nodes reach a consensus on a synchronization point to which to recover. Each node applies change records from the node's persistent log to the appropriate checkpoint image for the node. Transactions before the synchronization points are recovered while transactions after the synchronization point and uncommitted transactions are rolled back.

Generating synchronization points and performing database recovering in this way is referred to as Asynchronously Flushed Database Recovery. Asynchronously Flushed Database Recovery creates non-blocking synchronization points which can be used in recovery in case of a database failure. Asynchronously Flushed Database Recovery may guarantee database consistency after recovery and limits data loss to transactions committed after the last valid synchronization point before the failure.

Synchronization points are used to orchestrate change record flushing on all nodes when certain criteria are met. It is non-blocking, so workloads will not be affected when synchronization points are being created periodically in the background. During recovery, Asynchronously Flushed Database Recovery requires very little communication and negotiation between nodes. Once all nodes reach a consensus on which synchronization point to recover to, each node simply performs local recovery similar to point-in-time recovery. Each node will know exactly which transactions to keep and which to throw away to ensure no consistency violation.

Illustrative Distributed Database Management System

Figure 1:
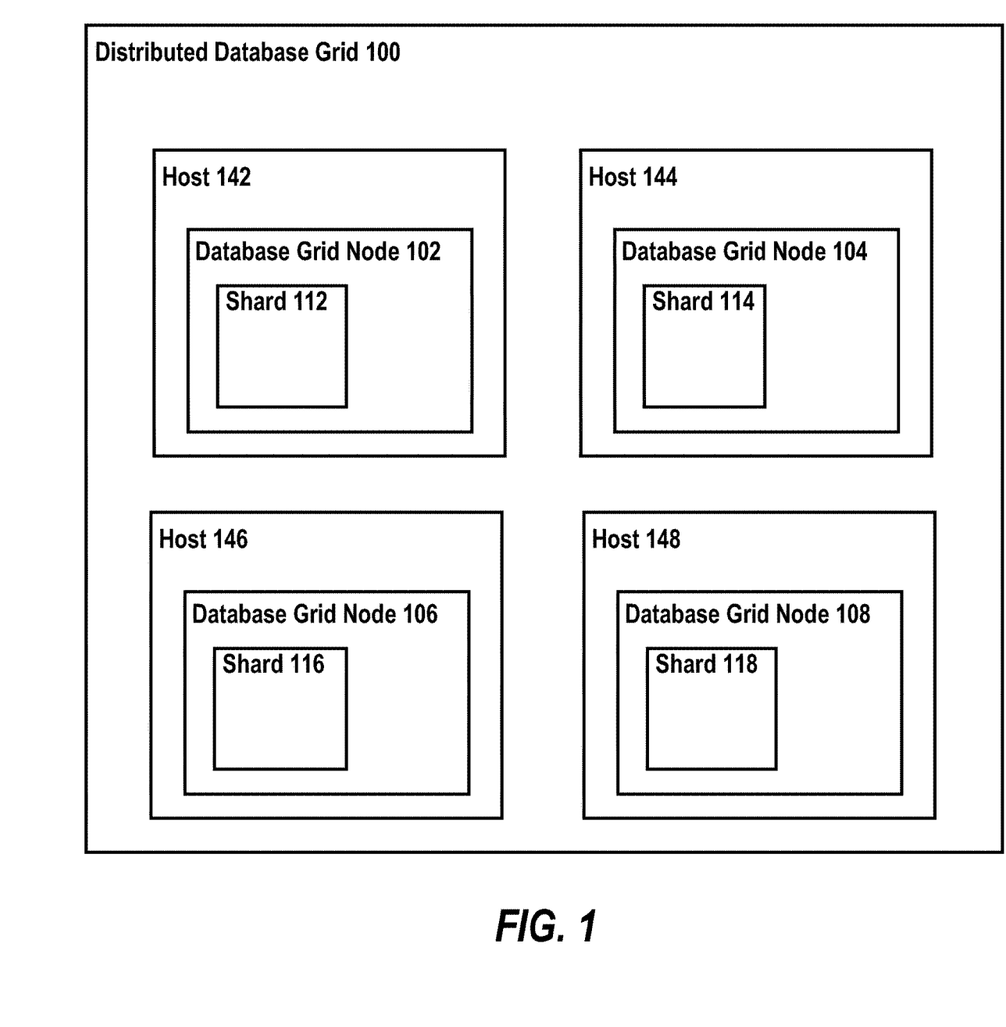
FIG. 1 is a block diagram of an embodiment of a distributed database grid.

FIG. 1 is a block diagram of an embodiment of a distributed database grid.

Distributed database grid 100 includes a plurality of database grid nodes 102, 104, 106, and 108. Hosts 142, 144, 146, and 148 are computing devices.

Each database grid node 102-108 includes data and one or more daemon processes that perform database functionality such that each database grid node 102-108 can function as a self-contained database system. Daemon processes may comprise one or more processes responsible for various resource management tasks at their respective database grid nodes, such as maintaining and reporting statistics regarding data usage and connections, managing shared memory access and policies, and starting and/or recovering various components of their respective mid-tier database grid nodes. Database grid nodes 102-108 may further comprise any number of additional components as needed.

Database grid nodes 102-108 are configured to store a database shard of a database that is distributed across database grid nodes 102-108 in accordance with a distribution scheme. Database grid nodes 102-108 may further comprise additional components stored in a volatile memory, including indexes and temporary space. Other components of database grid nodes 102-108 may include transaction logs and recovery data, such as a checkpoint image, which may be stored in a persistent storage such as a flash disk or hard disk associated with a host 142, 144, 146 or 148 executing an instance of the database grid nodes 102-108.

In an embodiment, each database grid node 102-108 has its own persistent logs and checkpoint image, which may be persisted to disk as files. In the event of a system restart or failure, the in-memory database is recovered from the checkpoint image and persistent logs. In an embodiment, one or more database grid nodes 102-108 comprise an in-memory database that resides entirely in volatile memory at run time and is periodically persisted as checkpoint images stored in disk storage for the ability to recover and restart, such as but not limited to an Oracle TimesTen™ database. TimesTen™ provides full transactional support for SQL operations, and the transaction logs are persisted to disk for recovery. In the event of a system restart or failure, the in-memory database may be recovered from the persistent logs and checkpoint images, using, for example, Asynchronously Flushed Database Recovery, as described in further detail.

A distributed database grid is described in U.S. patent application Ser. No. 14/709,018, DIRECT-CONNECT FUNCTIONALITY INA DISTRIBUTED DATABASE GRID, filed by Tirthankar Lahiri, et al. on May 11, 2015, the entire contents of which are incorporated by reference.

Distribution Scheme

In an embodiment, each database grid node 102-108 stores a database shard of a database in accordance with a distribution scheme. A database shard may comprise one or more tables. Different tables may be divided based on different distribution schemes. The database may be distributed over the database grid nodes 102-108 in order to spread data, co-locate data and/or localize data. In an embodiment, one or more tables are partitioned in accordance with a hash distribution scheme. At least a portion of the database, such as one or more tables, is partitioned among database shards 112, 114, 116, and 118 in accordance with a reference distribution scheme. In another embodiment, the database is a distributed database, comprising separate and distinct databases stored on each of database grid nodes 102-108, with none of the separate and distinct databases storing a portion or partition of a table stored in another of the separate and distinct databases. Each database may have its own database dictionary defining different tables and/or database objects.

Database Shards

Figure 2:
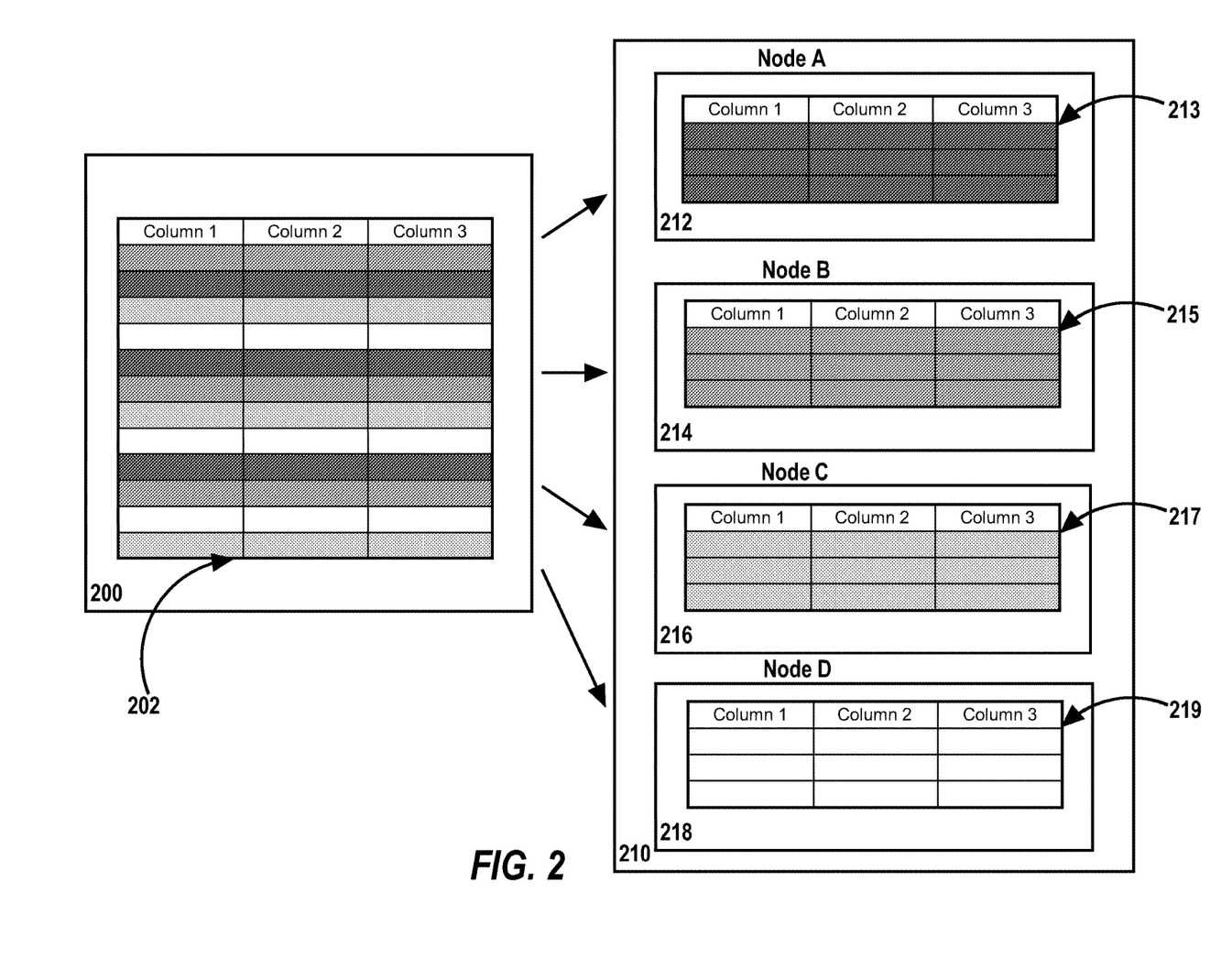
FIG. 2 illustrates an example of an unsharded database and a distributed database gird.

FIG. 2 illustrates an example of an unsharded database 200 and a distributed database grid 210. Unsharded database 200 is a relational database and includes table 202. All of the contents of table 202 are stored in the same unsharded database 200, and thus use the same kind of computing resources, such as processors, memory, and disk space.

Distributed database grid 210, however, depicts an alternative configuration using sharding techniques. Distributed database grid 210, includes four shards 212, 214, 216, and 218. Each of the shards 212-218 is on its own host and includes its own tables 213, 215, 217 and 219, respectively. However, in distributed database grid 210, table 202 has been horizontally partitioned across shards 212-218 into tables 213-219. Horizontal partitioning in a distributed database involves splitting a database table, such as table 202, across shards so that each shard contains a subset of rows of table 202. In this example, tables 213-219 each contain a subset of rows of table 202. Collectively, tables 213-219 can be referred to as a "sharded table." The data collectively stored in tables 213-219 is equivalent to the data stored in table 202. Thus, updating data stored in table 202 may involve updating Nodes A, B, C, and D.

Structural Overview

Figure 3:
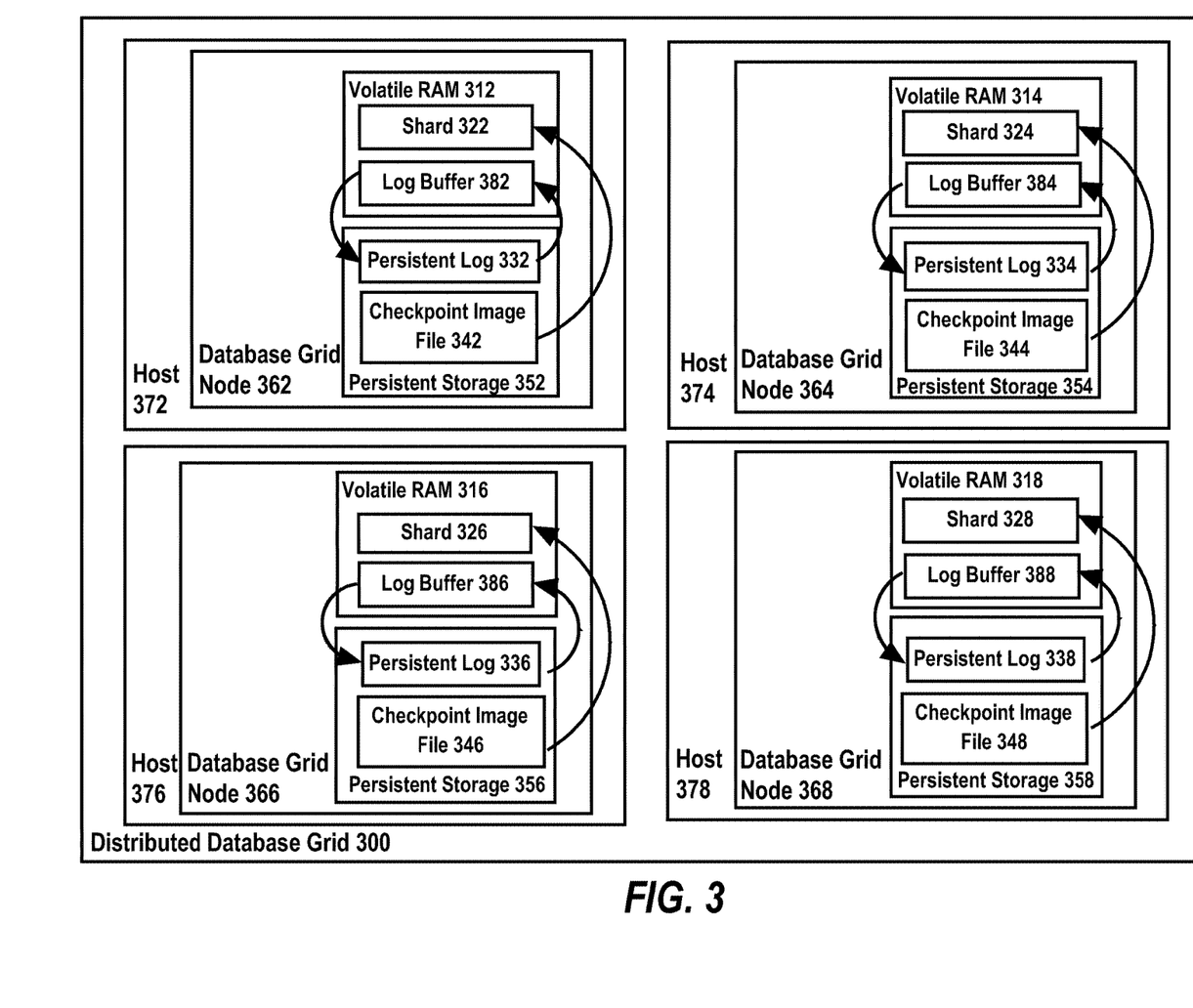
FIG. 3 shows a distributed database grid according to an embodiment of the present invention.

FIG. 3 shows a Distributed database grid 300, a distributed database according to an embodiment of the present invention. Distributed database grid 300 comprises a plurality of Database grid nodes 362, 364, 366 and 368. Hosts 372, 374, 376, and 378 are computing devices.

Database grid nodes 362-368 comprise Persistent storages 352, 354, 356, and 358 and Volatile RAMs 312, 314, 316, and 318, and one or more processors (not shown), respectively.

Shards 322, 324, 326, and 328, which are managed and accessed by Distributed database gird 300, are stored in Volatile RAMs 312-318, respectively. Changes to Shards 322-328 are recorded in change records (redo and undo records) in Log buffers 382, 384, 386, and 388 before writing them out to Persistent logs 332, 334, 336, and 338, respectively. The change records are cleared from Log buffers 382-388 after they are persistently stored in Persistent logs 332-338.

Persistent logs 332-338 are used to store change records, each of which may store a description of a change that a transaction makes to a shard and/or a description of action taking regarding the transaction (e.g., a commit). Storing change records in persistent storages ensures durability. A transaction is durably committed when a change record is durably stored. By using persistent storage to store change records, a transaction is durably committed when the commit record is written to the persistent log stored in persistent storage, which ensures data is persistently stored in the case of system failure.

For Distributed databases grid 300, flushing change records of a transaction from log buffers stored in volatile RAM to persistent log stored in persistent storage happens on all nodes. Each of Database grid nodes 362-368 employ asynchronous flushing, which allows a transaction to complete more quickly than synchronous flushing. For synchronous flushing, a transaction is acknowledged as committed only after change records of the transaction are flushed from a log buffer in volatile RAM to a persistent log in persistent storage. In comparison, for asynchronous flushing, a transaction is acknowledged as committed without requiring change records of the transaction to be flushed from a log buffer in volatile RAM to a persistent log in persistent storage. Asynchronous flushing allows Database grid nodes 362-368 to acknowledge transactions as soon as change records of the transactions are written to Log buffers 382-388 in Volatile RAMs 312-318, before writing them to Persistent logs 332-338 in Persistent storages 352-358. This can provide a significant boost in throughput for transactions. However, with asynchronous flushing, change records stored in Persistent logs 332-338 for committed transactions can be inconsistent between Database grid nodes 362-368 in the case of system failure.

A checkpoint image of each of shards 322-328 is periodically generated and is stored in Checkpoint image files 342, 344, 346, and 348 in Persistent storage 352-358, respectively.

In order to provide consistent database recovery after a system failure, on a periodic basis, each of Database grid nodes 362-368 coordinates to establish a synchronization point, which may entail ensuring change records for transactions that committed at or before the synchronization point are stored in persistent logs 332-338. In effect, a synchronization point represents that any transaction committed at or before the synchronization point has been issued.

A synchronization point is periodically generated or is generated upon request when the database is up and running.

Recovery entails loading the entire latest checkpoint image of each shard from persistent storage and applying the change records (i.e., redo and undo change records) to the checkpoint image to synchronize the database to a state that existed as of the synchronization point.

Assign a Timestamp to Each Transaction

According to an embodiment, a global timestamp is assigned to each transaction. Each transaction is assigned with a commit timestamp ts(T) when the commit of each transaction commences. According to an embodiment, a Lamport algorithm is used to assign timestamps in a decentralized manner while ensuring timestamps are logical correct across Distributed database grid 300. The use of a Lamport algorithm ensures all the transaction dependencies are preserved across the Shards 322, 324, 326, and 328.

In an embodiment, assigning a global timestamp for each transaction satisfies the following conditions:

Each transaction is assigned to one global timestamp.

For any distributed transaction T, each node participating in the distributed transaction learns about the timestamp ts(T) and assigns ts(T) to the distributed transaction T before committing. Before committing, changes records for the transaction are stored in log buffer and may be asynchronously flushed to a persistent log. A daemon process may read the log buffer and flush the change from the log buffer to persistent logs.

If a transaction T2 has a dependency on transaction T1, then T2 is assigned with a timestamp larger than T1. The dependency could be parent-child, unique constraint check, or any logical data dependency, etc.

A lower bound of timestamps is set for future transactions when a synchronization point for recovery is created. For example, if a synchronization point (SP) is created, then a lower bound of timestamp ts(SP) is set for any future transaction when SP is created. The lower bound of a timestamp is used to ensure all future transactions are assigned with a larger timestamp than the synchronization point.

Create Synchronization Points for Recovery

In an embodiment, synchronization points (SP) are created periodically or upon request when a database system is up and running.

Figure 4A:
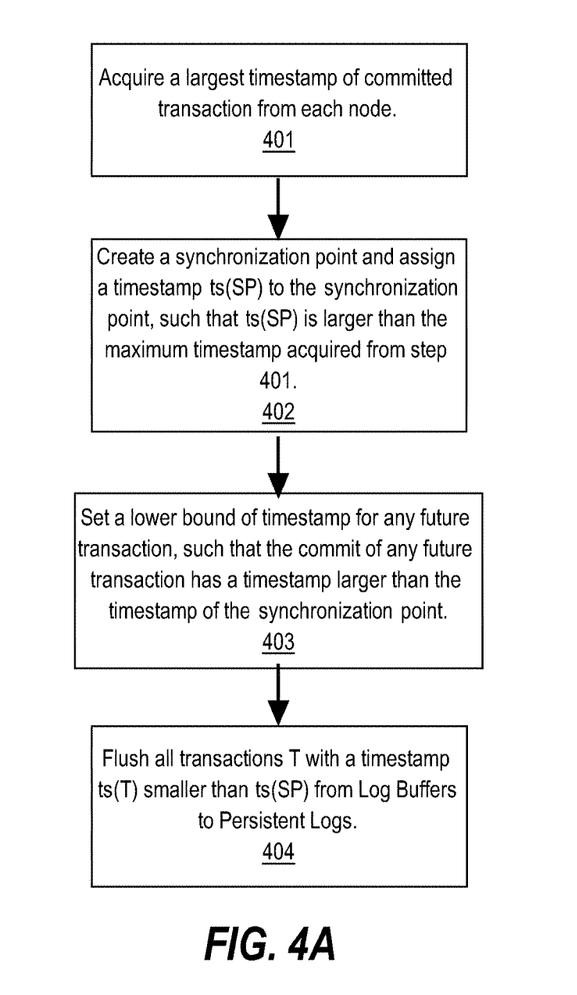
FIG. 4A illustrates a flow diagram that depicts creating a synchronization point for database recovery.

FIG. 4A illustrates a flow diagram that depicts creating a synchronization point.

At step 401, the largest timestamp of committed transactions is acquired from each Database grid nodes 362-368 in Distributed database grid 300. For example, suppose Database gird node 362 committed two transactions T1 and T2. Suppose transaction T2 is committed at a later time than transaction T1, timestamp ts(T2) would be larger than timestamp ts(T1) and would be acquired as the largest timestamp of transactions Database grid node 362 committed.

At step 402, a synchronization point (SP) is created, and a timestamp ts(SP) is assigned to the SP. Timestamp ts(SP) is larger than the maximum timestamp acquired from step 401. For example, suppose each timestamps ts(T2), ts(T4), is (T6), ts(T8) is the largest timestamp of transactions each Database gird nodes 362-368 committed, respectively. A synchronization point is created and is assigned with a timestamp ts(SP) larger than all timestamps ts(T2), ts(T4), ts(T6), and ts(T8).

At step 403, a lower bound timestamp is set for future transactions. Setting a lower bound timestamp for future transaction ensures all future transactions committed after the SP are assigned with a timestamp larger than the timestamp of the synchronization point.

At step 404, all transactions T with a timestamp ts(T) smaller than ts(SP) are flushed from Log buffers 382-388 in Volatile RAMs 312-318 to Persistent logs 332-338 in Persistent storages 352-358. For any transaction committed before ts(SP) that, at commencement of step 404, has change records that were not durably stored, those change records are durably stored in a persistent log. Thus, the creation of a synchronization point ensures all change records associated with all transactions committed before the particular synchronization point are stored in Persistent logs 332-338 in Persistent storages 352-358. In effect, a synchronization point represents that any transaction committed at or before the synchronization point has been durably committed.

Recovering Each Node to a Synchronization Point

In an embodiment, synchronization points are used to recover a database after a system failure.

Figure 4B:
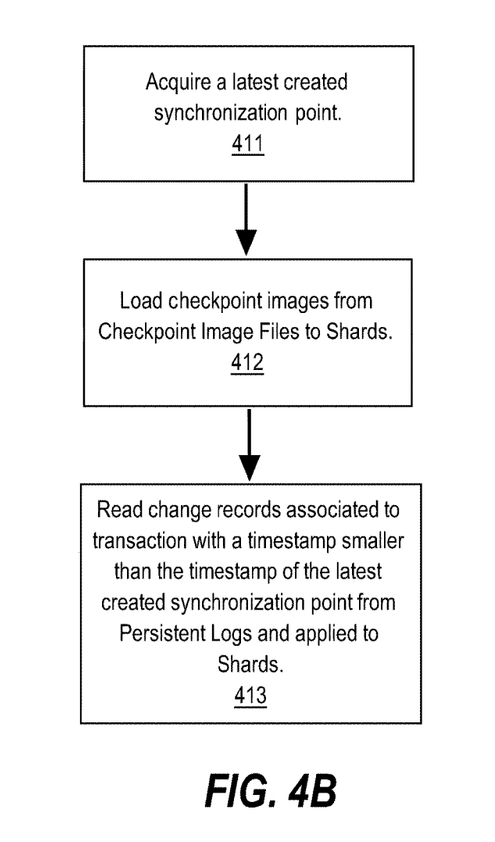
FIG. 4B illustrates a flow diagram that depicts using a synchronization point for consistent database recovery after database failure for a distributed database system.

FIG. 4B illustrates a flow diagram that depicts using a synchronization point for consistent database recovery after database failure for Distributed database grid 300.

At step 411, a latest created synchronization point is acquired.

At step 412, on each Database gird nodes 362-368, a checkpoint image is loaded from Checkpoint image files 342-348 in Persistent storages 352-358 to Shards 322-328, respectively.

Recovery of each Shards 312-318 begins with the state of the shard as reflected in the latest stored checkpoint image in Checkpoint image files 342-348.

At step 413, change records associated to transactions with a timestamp smaller than the timestamp of the latest created synchronization point is read from Persistent logs 332-338 in Persistent storage 352-358 and applied to Shard 322-328 in Volatile RAMs 312-318. Change records associated to transactions with a timestamp larger than the timestamp of the latest created synchronization point are not applied in database recovery even if the transaction is committed before the database failure.

Benefits and Applications

The Asynchronously Flushed Database Recovery may be superior over regular recovery. In particular, the Asynchronously Flushed Database Recovery ensures database consistency for a distributed database with asynchronized flush. The recovered database have no partially committed transaction and no dependency violation. The following discusses the benefits of implementing Asynchronously Flushed Database Recovery.

The Asynchronously Flushed Database Recovery ensures no transaction is partially committed after recovery. For any transaction T committed before a database failure, its timestamp ts(T) is either smaller or larger than the timestamp of a synchronization point ts(SP). If ts(T) is smaller than ts(SP), all of T's change records by definition are durably stored as part of the creation of SP, and T is recovered and committed on all participating nodes. If ts(T) is larger than ts(SP), T is rolled back on all participating nodes. Hence, for any chosen synchronization point SP, no transaction is partially committed after recovery.

The Asynchronously Flushed Database Recovery ensures no dependency violation after recovery. For example, suppose transaction T2 has a dependency on transaction T1, then timestamp ts(T1) is smaller than ts(T2). For a chosen synchronization point for recovery SP, suppose T2 is recovered and committed after recovery, then ts(T2) is smaller than ts(SP). Because ts(T1) is smaller than ts(T2) and ts(T2) is smaller than ts(SP), ts(T1) is smaller than ts(SP). Thus, T1 would be recovered and committed after recovery as well as T2. Hence, the Asynchronously Flushed Database Recovery ensures no dependency violation after recovery.

The Asynchronously Flushed Database Recovery achieves consistent database recovery with a relatively low impact on the normal workload since generation of synchronization point runs in the background. During recovery, Asynchronously Flushed Database Recovery requires very little negotiation and consolidation between nodes. Once all nodes reach a consensus on which synchronization point to recover to, each node simply performs local recovery similar to point-in-time recovery. Each node will know exactly which transactions to keep and which to throw away to ensure no consistency violation.

Memory Overview

Because embodiments of the invention involve using persistent storage, a description of memory is pertinent and useful. As used herein, "persistent" refers to a characteristic of a memory where data is retained in the absence of any form of electrical power, including external or battery backup. Examples of persistent storage include e-prom memory, flash memory, and disk memory. Persistent storage does not include volatile memory for which power is retained by a battery backup in the absence of another external power source. For example, volatile memory coupled to a board with an embedded battery-backup is not non-volatile memory, because, without the power provided by a battery, the volatile memory does not retain data.

Byte-addressable memory is distinguishable from block-addressable memory. A byte or word is the minimum amount of data that may be addressed, retrieved from memory, or written to in byte-addressable memory. To manipulate one or more bits in a byte or word, a byte or word containing the bit must be fetched to a register of a processor executing a machine instruction that references the byte or word and manipulated according to the machine instruction or another machine instruction.

In contrast, the minimum size for a unit of block-addressable memory is a data block. A data block comprises multiple bytes and multiple words and cannot be entirely stored within a register of a processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
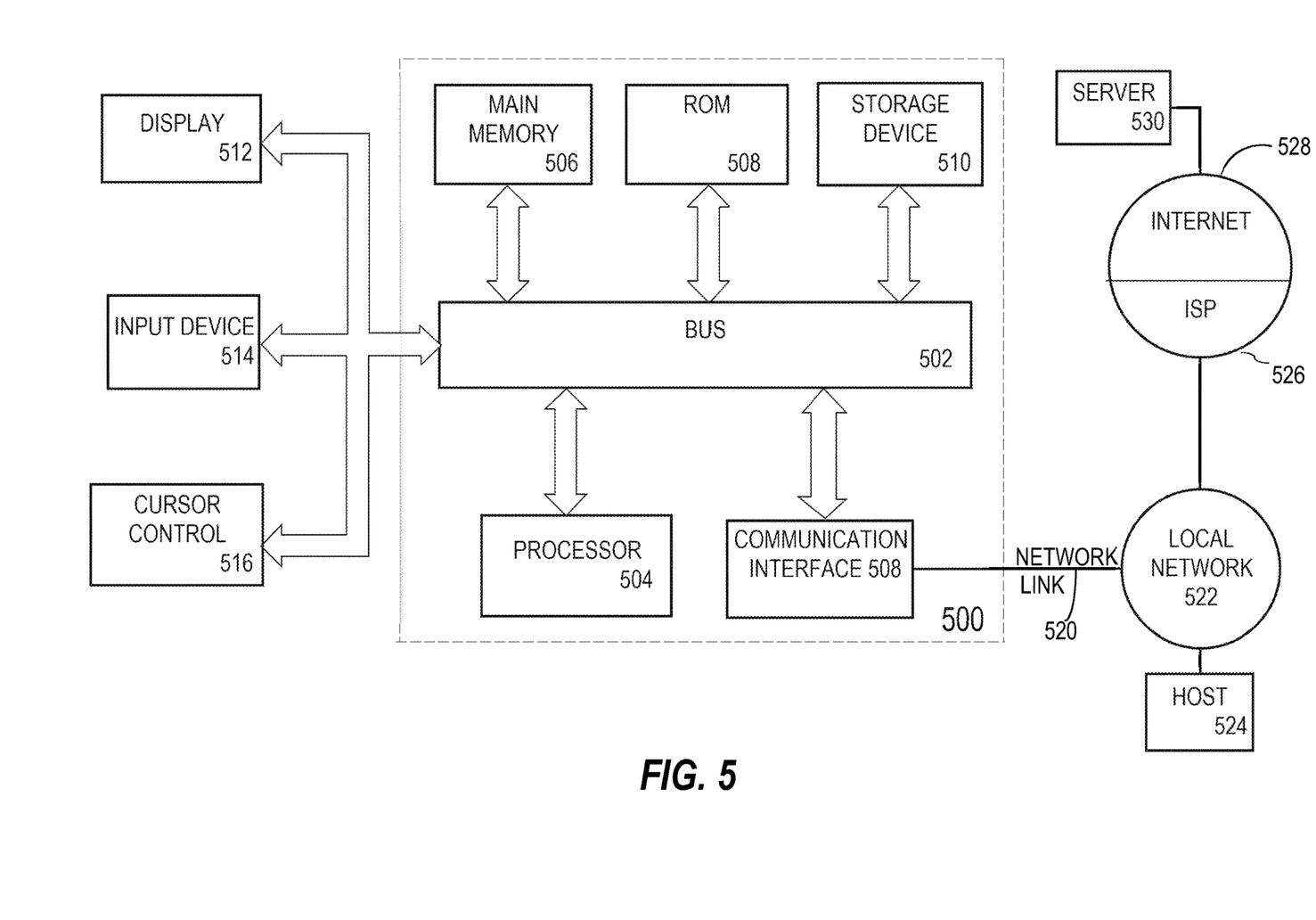
FIG. 5 is a diagram depicting a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

In some embodiments, co-processors may reside on the same chip as hardware processors or processor cores. Examples of such co-processors include a data analytics accelerator (DAX) co-processor and a single instruction, multiple data (SIMD) processor.

A DAX co-processor enables database operations to run directly in the co-processor while hardware processor cores execute other instructions. Such operations include (1) scanning an array for elements which match (or greater than or less than) an input value and returning a bit vector with bits set for matches; (2) selecting elements from an array based on a bit vector; and (3) in set operation, given an input set of integers, determining how many of them are also present in another set.

SIMD processors perform the same operation on multiple data items simultaneously. SIMD processors exploit data level parallelism by executing a single instruction against data in multiple registers or subregisters. Thus, the throughput per instruction may be increased accordingly.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to an embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
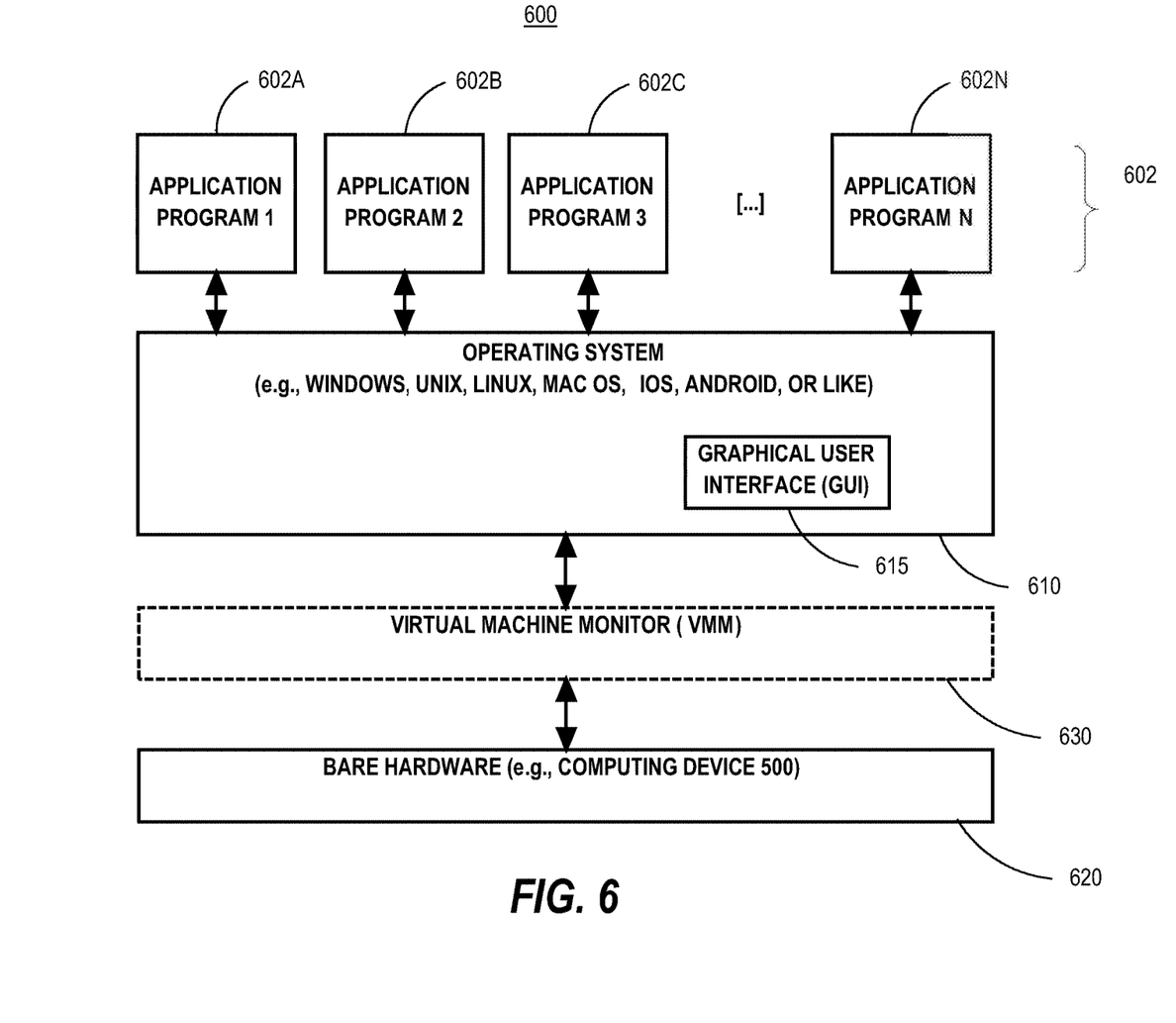
FIG. 6 depicts a software system that may be employed for controlling the operation of a computer system according to an embodiment of the present invention.

FIG. 6 is a block diagram of a software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 500. The applications or other software intended for use on system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 910 can execute directly on the bare hardware 620 (e.g., processor(s) 504) of system 600. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method comprising:
generating a plurality of change records corresponding to a plurality of database transactions executed by a multi-node database system against a database, wherein each node of said multi-node database system generates a respective set of change records of said plurality of change records;
said multi-node database system generating a plurality of synchronization points that each correspond to a respective global timestamp of said multi-node database system, wherein for each synchronization point of said plurality of synchronization points, each node of said multi-node database system has persistently stored all change records of the respective set of change records of said each node for any database transaction of said plurality of database transactions that has committed before or no later than the respective global timestamp of said each synchronization point;
for a particular synchronization point that corresponds to a particular global timestamp of said multi-node database system, recovering the database by at least, for a particular node of said multi-node database system, applying at least a respective subset of the respective set of change records of said particular node to roll forward one or more database transactions committed before or no later than said particular global timestamp; and
wherein the method is performed by one or more computing devices.

2. The method of claim 1, wherein generating a plurality of synchronization points includes, for said particular synchronization point, said multi-node database system ensuring change records for any database transactions being executed by said multi-node database system against the database that have committed at or before said particular synchronization point have been durably stored.

3. The method of claim 2, wherein said database transactions being executed by said multi-node database system against the database that have committed at or before said particular synchronization point include a particular database transaction, wherein said ensuring change records have been durably stored includes flushing change records for said particular database transaction to a persistent log, where said particular database transaction was committed before commencing flushing.

4. The method of claim 1, wherein the method further includes:
a particular node of said multi-node database system receiving a request to establish a synchronization point,
in response to said particular node receiving a request to establish a synchronization point, durably storing change records for one or more database transactions of said plurality of database transactions that have committed at or before said particular synchronization point.

5. The method of claim 4, wherein before commencing durably storing change records said one or more database transactions have been committed.

6. The method of claim 1, wherein the method further includes said multi-node database system non-durably committing said plurality of database transactions.

7. The method of claim 1, wherein generating said particular synchronization point of said plurality of synchronization points comprises assigning a timestamp to the particular synchronization point.

8. The method of claim 7, wherein assigning said timestamp to said particular synchronization point comprises:
  determining a plurality of largest timestamps, wherein determining a plurality of largest timestamps includes, determining, for each node of said multi-node database system, a respective largest timestamp of a database transaction of said plurality of database transactions that has been committed by said each node;
  determining a maximum timestamp among said plurality of largest timestamps; and
  assigning a timestamp larger than said maximum timestamp to said particular synchronization point.

9. The method of claim 1, wherein recovering said database includes:
  determining that one or more particular change records are for a database transaction that is committed after said particular synchronization point; and
  in response to determining that one or more particular change records are for a database transaction that is committed after said particular synchronization point, forgoing applying said particular change records to a checkpoint image.

10. The method of claim 1, wherein said database comprises a plurality of database shards, each database shard of said plurality of database shards being managed by a respective node of said multi-node database system.

11. One or more non-transitory computer-readable media storing instructions which, when executed by one or more processors, cause:
  generating a plurality of change records corresponding to a plurality of database transactions executed by a multi-node database system against a database, wherein each node of said multi-node database system generates a respective set of change records of said plurality of change records;
  said multi-node database system generating a plurality of synchronization points that each corresponds to a respective global timestamp of said multi-node database system, wherein for each synchronization point of said plurality of synchronization points, each node of said multi-node database system has persistently stored all change records of the respective set of change records of said each node for any database transaction of said plurality of database transactions that has committed before or no later than the respective global timestamp of said each synchronization point;
  for a particular synchronization point that corresponds to a particular global timestamp of said multi-node database system, recovering the database by at least, for a particular node of said multi-node database system, applying at least a respective subset of the respective set of change records of said particular node to roll forward one or more database transactions committed before or no later than said particular global timestamp.

12. The one or more non-transitory computer-readable media of claim 11, further comprising instructions, which when executed by the one or more processors, cause:
  ensuring change records for any database transactions being executed by said multi-node database system against the database that have committed at or before said particular synchronization point have been durably stored.

13. The one or more non-transitory computer-readable media of claim 12, wherein said database transactions being executed by said multi-node database system against database that have committed at or before said particular synchronization point include a particular database transaction, wherein said ensuring change records have been durably stored includes flushing change records for said particular database transaction to a persistent log, where said particular database transaction was committed before commencing flushing.

14. The one or more non-transitory computer-readable media of claim 11, further comprising instructions, which when executed by the one or more processors, cause:
  receiving a request to establish a synchronization point a particular node of said multi-node database system,
  in response to said particular node receiving a request to establish a synchronization point, durably storing change records for one or more database transactions of said plurality of database transactions that have committed at or before said particular synchronization point.

15. The one or more non-transitory computer-readable media of claim 14, further comprising instructions which, when executed by the one or more processors, cause:
  durably storing change records said one or more database transactions have been committed before commencing.

16. The one or more non-transitory computer-readable media of claim 11, further comprising instructions, which when executed by the one or more processors, cause said multi-node database system non-durably committing said plurality of database transactions.

17. The one or more non-transitory computer-readable media of claim 11, further comprising instructions, which when executed by the one or more processors, cause:
  assigning a timestamp to the particular synchronization point.

18. The one or more non-transitory computer-readable media of claim 17, further comprising instructions, which when executed by the one or more processors, cause:
  determining a plurality of largest timestamps, wherein determining a plurality of largest timestamps includes, determining, for each node of said multi-node database system, a respective largest timestamp of a database transaction of said plurality of database transactions that has been committed by said each node;
  determining a maximum timestamp among a plurality of largest timestamps; and
  assigning a timestamp larger than said maximum timestamp to said particular synchronization point.

19. The one or more non-transitory computer-readable media of claim 11, further comprising instructions, which when executed by the one or more processors, cause:
  determining that one or more particular change records are for a database transaction that is committed after said particular synchronization point; and
  in response to determining that one or more particular change records are for a database transaction that is committed after said particular synchronization point, forgoing applying said particular change records to a checkpoint image.

20. The one or more non-transitory computer-readable media of claim 11, wherein said database comprises a plurality of database shards, each database shard of said plurality of database shards being managed by a respective node of said multi-node database system.

* * * * *

UNITED STATES PATENT AND TRADEMARK OFFICE
CERTIFICATE OF CORRECTION

PATENT NO. : 11,188,516 B2
APPLICATION NO. : 16/522419
DATED : November 30, 2021
INVENTOR(S) : Taylor et al.

It is certified that error appears in the above-identified patent and that said Letters Patent is hereby corrected as shown below:

In the Specification

In Column 4, Line 65, delete "INA" and insert -- IN A --, therefor.

In Column 7, Line 35, delete "is" and insert -- ts --, therefor.

In the Claims

In Column 14, Line 10, in Claim 1, delete "correspond" and insert -- corresponds --, therefor.

In Column 14, Line 45, in Claim 3, delete "where" and insert -- wherein --, therefor.

In Column 15, Line 28, in Claim 11, delete "instructions which," and insert -- instructions, which --, therefor.

In Column 16, Line 6, in Claim 13, delete "where" and insert -- wherein --, therefor.

In Column 16, Line 21, in Claim 15, delete "instructions which," and insert -- instructions, which --, therefor.

In Column 16, Line 44, in Claim 18, delete "a" and insert -- said --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*